United States Patent
Kato et al.

(10) Patent No.: US 11,070,103 B2
(45) Date of Patent: Jul. 20, 2021

(54) MOTOR

(71) Applicant: Panasonic Intellectual Property Management Co., Ltd., Osaka (JP)

(72) Inventors: Yasushi Kato, Kyoto (JP); Yuichi Yoshikawa, Osaka (JP); Hirokazu Yamauchi, Osaka (JP); Keiichiro Nukada, Nara (JP); Mitsuoki Hishida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 157 days.

(21) Appl. No.: 16/483,050

(22) PCT Filed: Dec. 20, 2017

(86) PCT No.: PCT/JP2017/045646
§ 371 (c)(1),
(2) Date: Aug. 2, 2019

(87) PCT Pub. No.: WO2018/154943
PCT Pub. Date: Aug. 30, 2018

(65) Prior Publication Data
US 2020/0235628 A1    Jul. 23, 2020

(30) Foreign Application Priority Data
Feb. 21, 2017 (JP) .............................. JP2017-030158

(51) Int. Cl.
*H02K 3/28* (2006.01)
*H02K 3/12* (2006.01)

(52) U.S. Cl.
CPC ................. *H02K 3/28* (2013.01); *H02K 3/12* (2013.01); *H02K 2213/03* (2013.01)

(58) Field of Classification Search
CPC ......... H02K 3/28; H02K 3/12; H02K 2213/03
See application file for complete search history.

(56) References Cited

U.S. PATENT DOCUMENTS 7,737,600 B2 *  6/2010  Endo ....................... H02K 1/08
                                                    310/216.111
2006/0208594 A1  9/2006  Kashihara et al.
(Continued)

FOREIGN PATENT DOCUMENTS

DE       102012212637       1/2014
JP       2005-137174 A       5/2005
(Continued)

OTHER PUBLICATIONS

The Extended European Search Report dated Dec. 19, 2019 for the related European Patent Application No. 17898229.4.
(Continued)

*Primary Examiner* — Thienvu V Tran
*Assistant Examiner* — Bart Iliya
(74) *Attorney, Agent, or Firm* — McDermott Will and Emery LLP

(57) ABSTRACT

A motor includes a stator core, teeth respectively protruding from the stator core, and coils respectively wound onto the teeth n (n is an integer of 2 or greater) turns including first to n-th turns. Within each of ranges respectively wound with the coils onto the teeth in directions of protrusion of the teeth from the stator core, the first turn of each of the coil lies adjacent to a center of the motor. A k-th (k is an integer, 1<k≤n) turn of each of the coils lies opposite to the center of the motor. The first turn when each of the coils is cut in a corresponding one of the directions of protrusion of the teeth from the stator core is greater in cross-sectional area than each of the k-th turn and the n-th turn.

2 Claims, 4 Drawing Sheets

(56) References Cited

U.S. PATENT DOCUMENTS

| | | | |
|---|---|---|---|
| 2011/0127872 A1* | 6/2011 | Podack | H02K 15/0421 |
| | | | 310/180 |
| 2015/0042185 A1 | 2/2015 | Buttner et al. | |
| 2015/0188371 A1* | 7/2015 | Kato | H02K 3/18 |
| | | | 310/208 |
| 2016/0315525 A1 | 10/2016 | Hongo | |
| 2017/0040859 A1* | 2/2017 | Langlard | H02K 15/0068 |
| 2020/0287446 A1 | 9/2020 | Hongo | |

FOREIGN PATENT DOCUMENTS

| | | |
|---|---|---|
| JP | 4609190 B | 1/2011 |
| JP | 5592554 B1 | 9/2014 |
| JP | 6092862 B2 | 3/2017 |
| JP | 6505431 B2 | 4/2019 |
| WO | 2005/107040 | 11/2005 |
| WO | 2013/187501 A1 | 12/2013 |

OTHER PUBLICATIONS

International Search Report of PCT application No. PCT/JP2017/045646 dated Mar. 20, 2018.
Communication pursuant to Article 94(3) EPC dated Mar. 10, 2021 for the related European Patent Application No. 17898229.4.

* cited by examiner

MOTOR

TECHNICAL FIELD

The technique disclosed herein relates to a structure of coils in a motor.

BACKGROUND ART

Industry motors and on-vehicle motors have been highly demanded in recent years. In particular, a low cost but highly efficient motor has been demanded.

As a method for improving efficiency of a motor, increasing a space factor of coils respectively disposed within slots of a stator has been known. Increasing a space factor of coils can suppress a loss due to a current flowing into the coils when a motor is driven.

As a method for increasing a space factor of coils, such a configuration has been proposed that molded coils made of a copper material are respectively disposed within slots (e.g., see PTL 1).

When coils are produced through molding or forming, for example, the coils have been each made uniform in cross-sectional area to achieve uniform resistance. On the other hand, heat is a factor of lowering efficiency of a motor. When Joule heat is generated, heat easily accumulates in coils. A path of radiation of heat generated in each of the coils differs depending on arrangement of members respectively lying adjacent to the coils or a flow path of refrigerant, for example. Heat distribution in the coils is therefore not uniform. However, in coils each having a cross-sectional area made uniform, heat radiation effects due to the coils are concentrated within the cross-sectional areas.

CITATION LIST

Patent Literature

PTL 1: Unexamined German Patent Publication No. 102012212637

SUMMARY OF THE INVENTION

In view of the problems described above, the technique disclosed herein has an object of further increasing heat radiation effects due to coils to achieve a highly efficient motor.

To achieve the object described above, a motor according to the technique disclosed herein includes a stator including a stator core and teeth respectively protruding from the stator core in predetermined directions of protrusion, and coils respectively wound onto the teeth n (n is an integer of 2 or greater) turns including first to n-th turns. Within each of ranges respectively wound with the coils onto the teeth in the predetermined directions of protrusion of the teeth, the first turn of each of the coils lies adjacent to a center of the motor. A k-th (k is an integer, $1<k\le n$) turn of each of the coils lies opposite to the center of the motor. The first turn when each of the coils is cut in a corresponding one of the predetermined directions of protrusion of the teeth is greater in cross-sectional area than each of the k-th turn and the n-th turn.

With the configuration, the cross-sectional area of a part lying adjacent to the center of the motor is greater in each of the coils, further increasing heat radiation effects due to the coils with respect to the refrigerant flowing adjacent to the center of the motor or a space lying adjacent to the center of the motor, for example. Therefore, a highly efficient motor can be achieved.

The motor may be configured such that n is an integer of 3 or greater, k is an integer smaller than n, and the k-th turn of each of the coils is greater in cross-sectional area than the n-th turn.

The motor may be configured such that the first turn of each of the coils is largest in cross-sectional area among the first to n-th turns, and each of the coils gradually reduces in cross-sectional area from the first turn to the n-th turn.

According to the present disclosure, heat radiation effects due to the coils can be further increased, achieving a highly efficient motor.

DESCRIPTION OF EMBODIMENT

An exemplary embodiment will be described herein in detail with reference to the accompanying drawings. The preferable exemplary embodiment described below is a substantially mere example, and does not intend to limit the present invention, applications, and purposes.

Exemplary Embodiment

Motor Structure

Figure 1A:
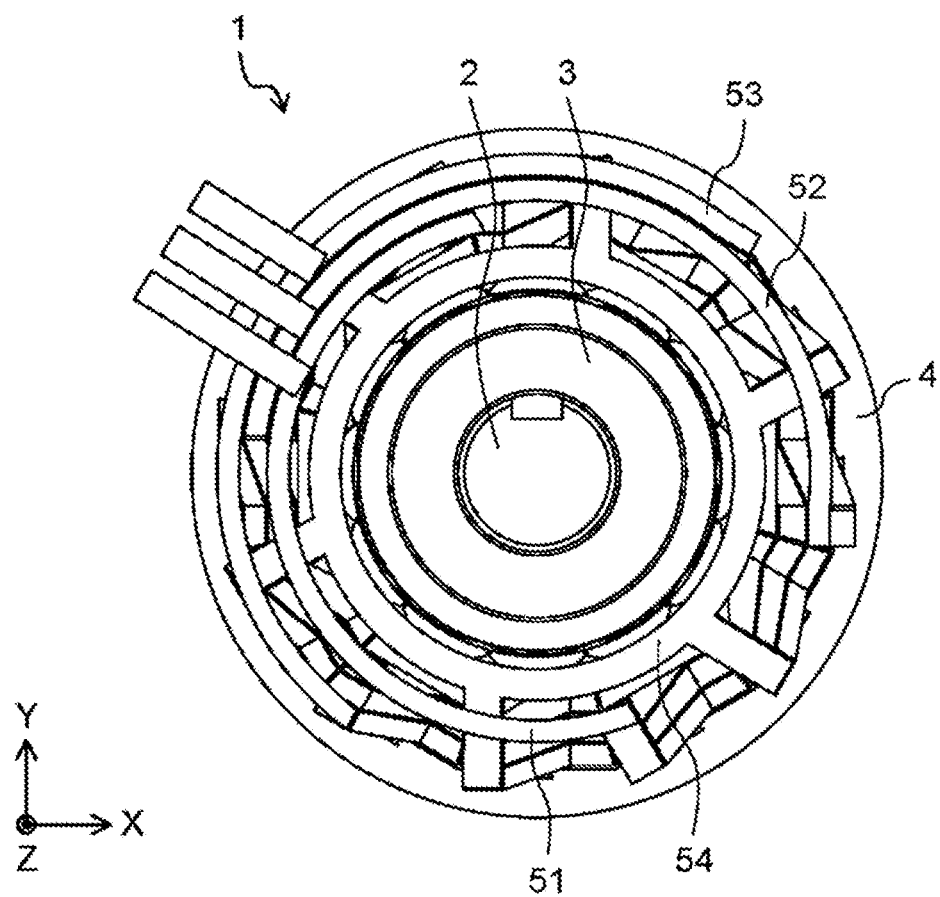
FIG. 1A is a top view illustrating a motor according to an exemplary embodiment.
Figure 1B:
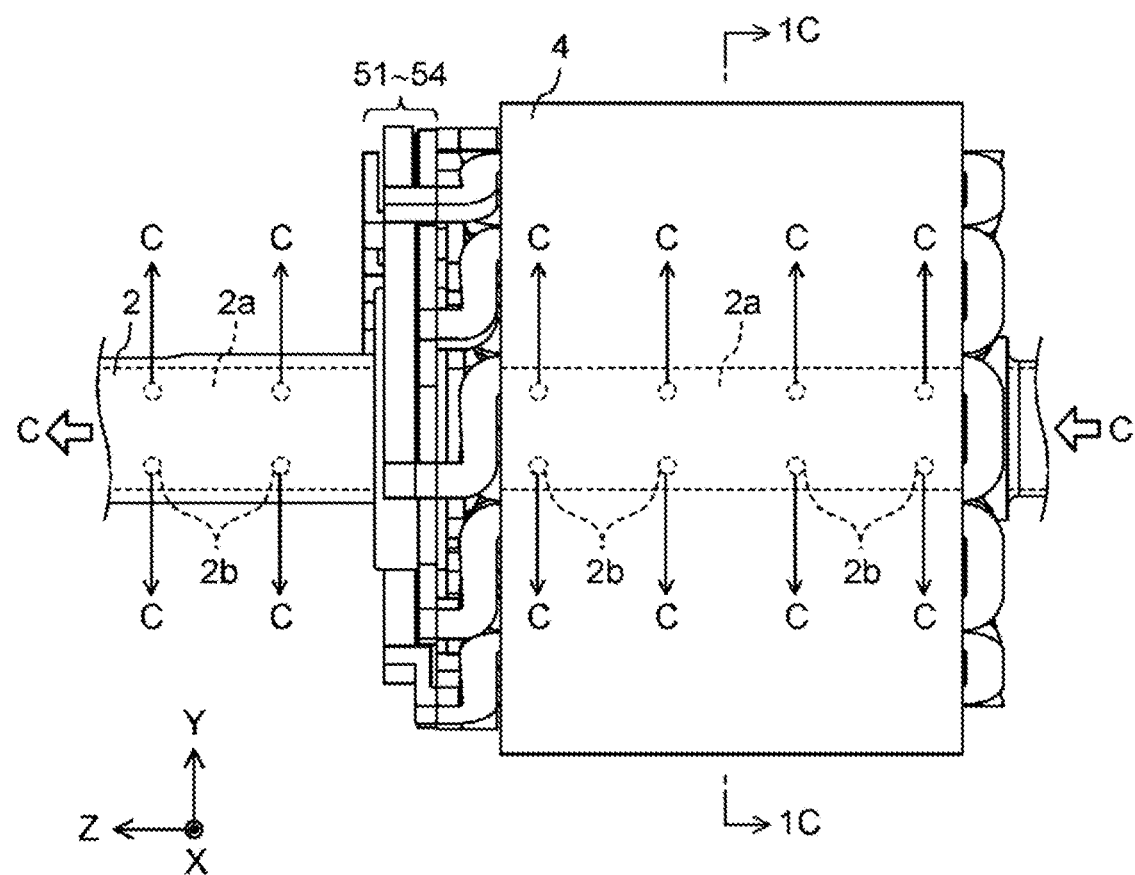
FIG. 1B is a side view illustrating the motor according to the exemplary embodiment.
Figure 1C:
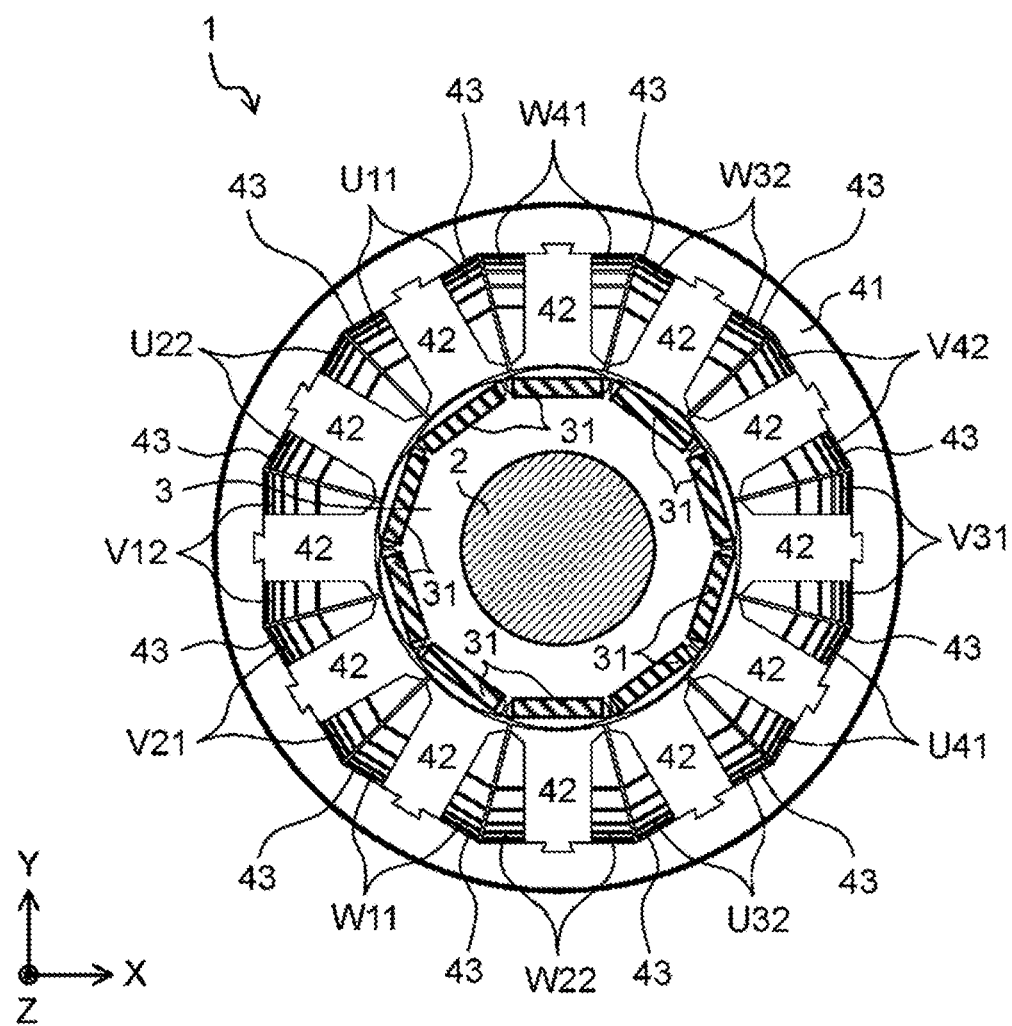
FIG. 1C is a cross-sectional view taken along line 1C-1C in FIG. 1B.

FIG. 1A is a top view illustrating motor 1 according to an exemplary embodiment. FIG. 1B is a side view illustrating motor 1 according to the exemplary embodiment. FIG. 1C is a cross-sectional view taken along line 1C-1C in FIG. 1B. However, the views do not illustrate a cover case, for example. In FIG. 1C, only a main part is illustrated as a hatched cross section. Inside of the cover case (not illustrated), motor 1 includes shaft 2, rotor 3, stator 4, coils U11 to U41, V12 to V42, and W11 to W41, and bus bars 51 to 54.

In here, a longer direction (a direction vertical to a paper plane of FIG. 1A) of shaft 2 is referred to as a Z-axis direction. Directions orthogonal to the Z-axis direction (directions parallel to the paper plane of FIG. 1A) are respectively referred to as an X-axis direction and a Y-axis direction. The X-axis direction and the Y-axis direction are orthogonal to each other.

A term "integrated" or "integrally" denotes a state of an object where not only a plurality of constituent parts are mechanically coupled with each other with bolts or through caulking, for example, but also a plurality of constituent parts are electrically coupled with each other through material coupling such as covalent coupling, ion coupling, or metal coupling, for example, or a plurality of constituent parts are electrically coupled with each other through material coupling after all of the constituent parts are melted.

Shaft 2 internally includes hollow part 2a extending in the Z-axis direction. A plurality of through holes 2b are provided on a side surface of shaft 2. Hollow part 2a serves as a passage for refrigerant C used to cool inside of motor 1. Refrigerant C flows inside of hollow part 2a in the Z-axis direction. With an externally provided pump, for example (not illustrated), refrigerant C circulates and flows inside of motor 1. Some of refrigerant C flowing inside of hollow part 2a flows from the plurality of through holes 2b outward from around a center of motor 1, i.e., flows from rotor 3 toward stator 4, to cool rotor 3 and stator 4.

Rotor 3 is provided to abut an outer circumference of shaft 2. Rotor 3 includes magnets 31 each facing stator 4. Magnets 31 respectively have N-poles and S-poles alternately disposed in an outer circumference direction of shaft 2. In the exemplary embodiment, neodymium magnets are used as magnets 31 used in rotor 3. However, a material and a shape of each of magnets 31 can be appropriately changed in accordance with an output of a motor, for example.

Stator 4 includes stator core 41 having a substantially annular shape, a plurality of teeth 42 provided on an inner circumference of stator core 41 at equal intervals, and slots 43 respectively provided between teeth 42. When viewed in the Z-axis direction, stator 4 is disposed outside of rotor 3 to be away from rotor 3 at a certain gap.

Stator core 41 is die-cut and formed from electromagnetic steel sheets containing silicon, for example, and laminated to each other, for example.

In the exemplary embodiment, rotor 3 includes a total of ten magnetic poles, including five N-poles and five S-poles facing stator 4. A number of slots 43 is 12. However, a number of magnetic poles of rotor 3 and a number of slots 43 are not limited to the numbers described above. A combination of another number of magnetic poles and another number of slots is also applicable.

Stator 4 includes 12 coils U11 to U41, V12 to V42, and W11 to W41. Each of coils U11 to U41, V12 to V42, and W11 to W41 is attached to a corresponding one of teeth 42, and disposed in a corresponding one of slots 43 when viewed in the Z-axis direction. That is, coils U11 to U41, V12 to V42, and W11 to W41 are respectively wound in a concentrated manner with respect to teeth 42. Furthermore, coils U11 to U41 are integrally disposed to bus bar 51, coils V12 to V42 are integrally disposed to bus bar 52, and coils W11 to W41 are integrally disposed to bus bar 53.

In each of symbols UPQ, VPQ, and WPQ representing the coils, a first letter represents one of phases of motor 1 (one of U-phase, V-phase, and W-phase in the exemplary embodiment). A second letter represents an order of arrangement of a corresponding one of the coils in the one of the phases. A third letter represents a direction of winding of the corresponding one of the coils. In the exemplary embodiment, 1 represents a clockwise direction, and 2 represents a counterclockwise direction. Therefore, coil U11 represents a first coil in an order of arrangement in the U-phase, and a direction of winding is the clockwise direction. Coil V42 represents a fourth coil in an order of arrangement in the V-phase, and a direction of winding is the counter clockwise direction. A term "clockwise" denotes right-handed rotation when viewed from the center of motor 1. A term "counterclockwise" denotes left-handed rotation when viewed from the center of motor 1.

Specifically, coils U11, U41 are U-phase coils, whereas coils U22, U32 are U-bar-phase (a direction of a magnetic field is opposite to a direction of a magnetic field generated from a U-phase coil) coils. However, the coils will be collectively referred to as U-phase coils unless otherwise specified. Similarly, coils V12 to V42 and coils W11 to W41 will be respectively collectively referred to as V-phase coils and W-phase coils.

(Features of Coil Cross Section)

Figure 2:
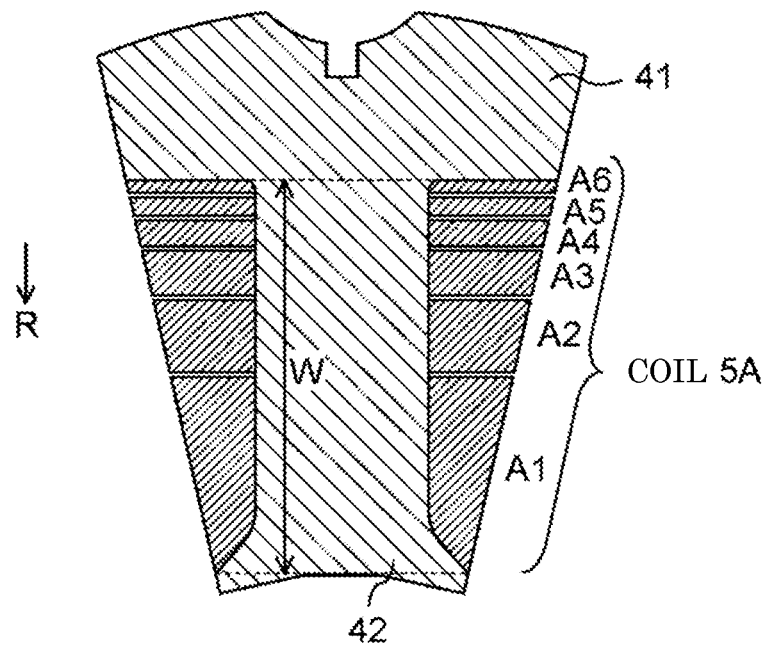
FIG. 2 is a partial enlarged view of FIG. 1C.

FIG. 2 is a partial enlarged view of FIG. 1C. FIG. 2 illustrates one of teeth 42 respectively protruding from stator core 41, and coil 5A wound onto the one of teeth 42. Stator core 41 lies on an outer side of motor 1. Teeth 42 lie adjacent to the center of motor 1. Coil 5A corresponds to one of coils U11 to U41, V12 to V42, and W11 to W41 illustrated in FIG. 1C. Coil 5A is mainly made of one of materials including copper, aluminum, zinc, magnesium, brass, iron, and steel use stainless (SUS), for example.

Each of the directions of protrusion of teeth 42 from stator core 41 is herein referred to as an R direction. FIG. 2 illustrates a cross section in the R direction. In FIG. 2, coil 5A is wound onto the one of teeth 42 six turns. A1 to A6 respectively represent cross sections at a first turn to a sixth turn of coil 5A. Symbols A1 to A6 may respectively represent cross-sectional areas at turns A1 to A6.

In the exemplary embodiment, the turns of coil 5A are not made uniform, but vary in cross-sectional area. A range wound with coil 5A onto the one of teeth 42 in the R direction is referred to as range W. In here, first turn A1 of coil 5A lies adjacent to the center of motor 1 within range W.

In the configuration in FIG. 2, first turn A1 of coil 5A is largest in cross-sectional area among first to sixth turns A1 to A6. Coil 5A gradually reduces in cross-sectional area from the first turn to the sixth turn (A1>A2>A3>A4>A5>A6). In other words, coil 5A gradually reduces in cross-sectional area outward from around the center of motor 1 within range W.

As described above, with the part that is expanded greater in cross-sectional area and that lies adjacent to the center of motor 1 in coil 5A, a heat-radiation amount can be increased with respect to refrigerant C, preventing heat from accumulating in coil 5A.

In the configuration in FIG. 2, only first turn A1 of coil 5A may be expanded greater in cross-sectional area than each of the other turns (A1>A2=A3=A4=A5=A6). Otherwise, the first turn to the sixth turn may be reduced in order in cross-sectional area in a stepwise manner (e.g., A1>A2=A3>A4=A5>A6).

In the exemplary embodiment, the number of turns of each of the coils is specified to, but not limited to, six. The number of turns of each of the coils can be however appropriately changed in accordance with a size or capability, for example, of motor 1.

Figure 3:
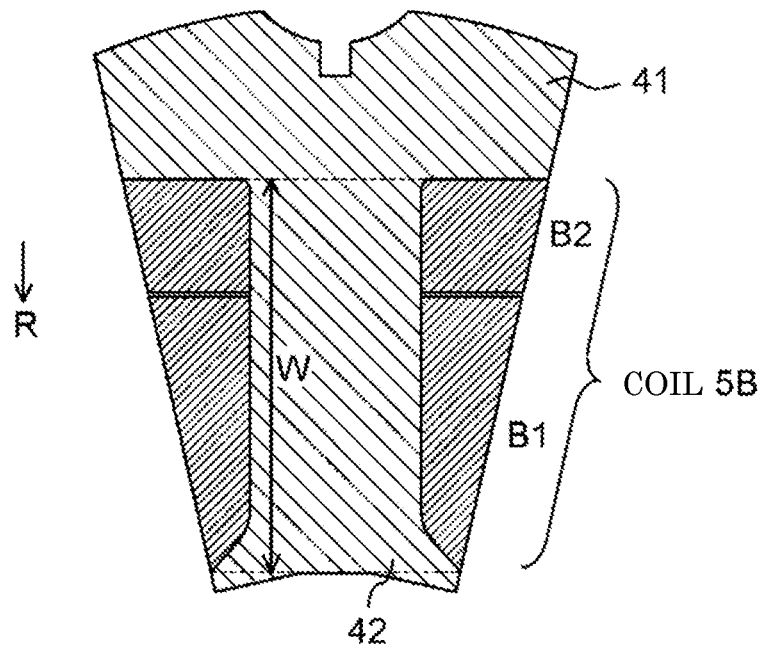
FIG. 3 is a cross-sectional view illustrating another configuration of one of teeth and one of coils.

FIG. 3 is a cross-sectional view illustrating another configuration of one of teeth and one of coils. A number of turns of coil 5B is two. Similar to FIG. 2, FIG. 3 illustrates one of teeth 42 respectively protruding from stator core 41, and coil 5B wound onto the one of teeth 42. Similar to coil 5A, coil 5B corresponds to one of coils U11 to U41, V12 to V42, and W11 to W41 illustrated in FIG. 1C. Coil 5B is mainly made of one of materials including copper, aluminum, zinc, magnesium, brass, iron, and SUS, for example.

Even in the configuration in FIG. 3, with first turn B1 being expanded greater in cross-sectional area than second turn B2 (B1>B2), a heat-radiation amount can be increased with respect to refrigerant C, preventing heat from accumulating in coil 5B.

Even when a number of turns of a coil is other than two and six, the configuration described in here may be similarly applied. A number of turns may be an odd number. In other words, the first turn of coil 5A or coil 5B lies adjacent to the center of motor 1 within a range wound with coil 5A or coil 5B onto one of teeth 42 n (n is an integer of 2 or greater) turns. On the other hand, when the k-th (k is an integer, 1<k≤n) turn of coil 5A or coil 5B lies opposite to the center of motor 1, the first turn when coil 5A or coil 5B is cut in each of the directions of protrusion of teeth 42 from stator core 41 may be made greater in cross-sectional area than each of the k-th turn and the n-th turn.

In the exemplary embodiment, the coils each have, without limitation, a substantially trapezoidal cross-sectional shape. However, the coils may each have a rectangular cross-sectional shape. Otherwise, the cross-sectional shapes of the coils may each be a circular shape, a polygonal shape, or a shape combined with a circular shape and a polygonal shape.

The exemplary embodiment has illustrated the example where coils U11 to U41 are integrated with bus bar 51, coils V12 to V42 are integrated with bus bar 52, and coils W11 to W41 are integrated with bus bar 53. However, the coils may be respectively attached to the bus bars through fusing or welding, for example, to correspond to coil shapes.

In the configuration of the exemplary embodiment, refrigerant C flows in hollow part 2a of shaft 2. However, refrigerant C may circulate and flow in a space between rotor 3 and stator 4, for example. Refrigerant C to be used can be liquid, such as oil, or gas, such as air, for example. Depending on specifications of motor 1, for example, motor 1 may be configured to be internally naturally air-cooled. Even in this case, heat radiates from the first turn of coil 5A, 5B in the space between rotor 3 and stator 4. Therefore, with the part having a cross-sectional area being expanded greater, heat radiation effects due to coil 5A, 5B can be increased.

As described above, motor 1 according to the exemplary embodiment includes stator 4 including stator core 41 and teeth 42 respectively protruding from stator core 41, and coils 5A respectively wound onto teeth 42 n (n is an integer of 2 or greater) turns including first to n-th turns. Within each of ranges respectively wound with coils 5A onto teeth 42 in the directions of protrusion of teeth 42 from stator core 41, the first turn of each of coils 5A lies adjacent to the center of motor 1. The k-th (k is an integer, 1<k≤n) turn of each of coils 5A lies opposite to the center of motor 1. The first turn when each of coils 5A is cut in a corresponding one of the directions of protrusion of teeth 42 from stator core 41 is greater in cross-sectional area than each of the k-th turn and the n-th turn.

In this configuration, the cross-sectional area of the part lying adjacent to the center of motor 1 is greater in each of coils 5A, further increasing heat radiation effects due to coils 5A with respect to the refrigerant flowing adjacent to the center of motor 1 or the space lying adjacent to the center of motor 1, for example. Therefore, motor 1 that is highly efficient can be achieved.

Motor 1 may be configured such that n is an integer of 3 or greater, k is an integer smaller than n, and the k-th turn of each of coils 5A is greater in cross-sectional area than the n-th turn.

Motor 1 may be configured such that the first turn of each of coils 5A is the largest in cross-sectional area among the first to n-th turns, and each of coils 5A gradually reduces in cross-sectional area from the first turn to the n-th turn.

INDUSTRIAL APPLICABILITY

The present disclosure effectively further increases heat radiation effects due to the coils in the motor, achieving a low cost but highly efficient motor.

REFERENCE MARKS IN THE DRAWINGS

1: motor
2: shaft
2a: hollow part
2b: through hole
3: rotor
4: stator
5A, 5B: coil
31: magnet
41: stator core
42: teeth
43: slot
51 to 54: bus bar
A1 to A6: cross section at turn of coil 5A
B1, B2: cross section at turn of coil 5B
C: refrigerant
U11, U22, U32, U41, V12, V21, V31, V42, W11, W22, W32, W41: coil

The invention claimed is:

1. A motor comprising:
a stator including a stator core and teeth respectively protruding from the stator core in predetermined directions of protrusion; and
coils respectively wound onto the teeth n, n is an integer of 2 or greater, turns including first to n-th turns, wherein
each of the coils is respectively wound onto the teeth in the predetermined directions of protrusion of the teeth, a first turn of each of the coils lies adjacent to a center of the motor, and a k-th, k is an integer, 1<k≤n, turn of each of the coils lies opposite to the center of the motor,
the first turn when each of the coils is cut in a corresponding one of the predetermined directions of protrusion is greater in cross-sectional area than each of the k-th turn and the n-th turn, the first turn of each of the coils is largest in cross-sectional area among the first to n-th turns,
each of the coils gradually reduces in cross-sectional area from the first turn to the n-th turn, and
mutually adjacent turns are different from each other in cross-sectional area.

2. The motor according to claim 1, wherein
n is an integer of 3 or greater,
k is an integer smaller than n, and
the k-th turn of each of the coils is greater in cross-sectional area than at the n-th turn.

* * * * *